March 25, 1958
R. F. LEARY
2,828,293
METHOD FOR PREPARING RESIN FEED
Filed Oct. 17, 1955
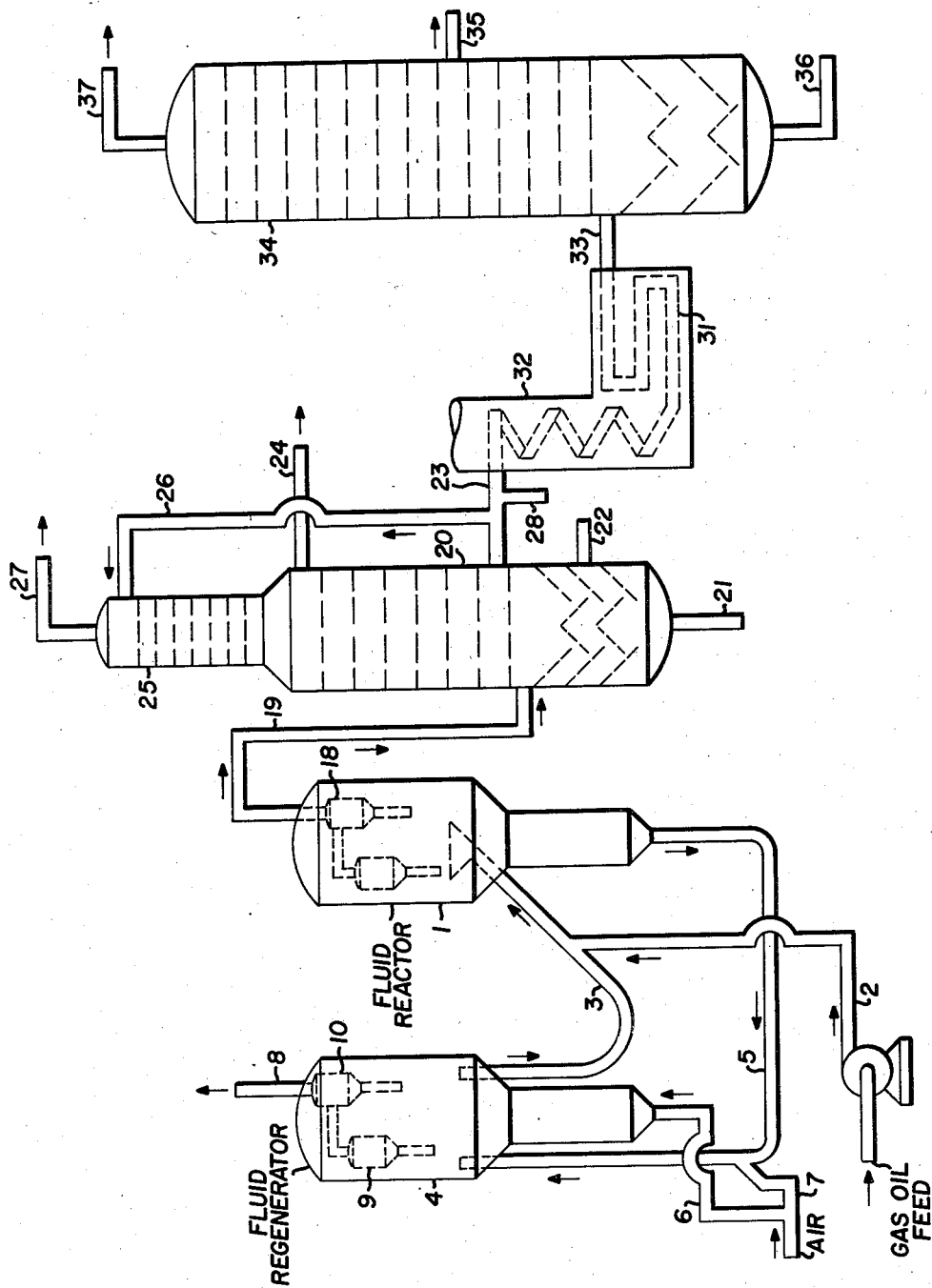
Robert F. Leary  Inventor
By *[signature]*  Attorney

2,828,293

METHOD FOR PREPARING RESIN FEED

Robert F. Leary, Cranford, N. J., assignor to Esso Research and Engineering Company, a corporation of Delaware Application October 17, 1955, Serial No. 540,880

6 Claims. (Cl. 260—82)

This invention relates to improved petroleum resins, and methods of producing same. More particularly, it relates to an improved method of making resins from cracked petroleum naphtha fractions.

It has been known that it is possible to treat steam-cracked distillate streams with polymerization catalysts and thereby produce resins of varying quality and utility. These resins have frequently been subject to certain difficulties such as low softening points, high unsaturation and high aniline point. Such properties make the resins unfit for many important uses such as in floor tile and in rubber and plastics formulations.

The improved process of this invention comprises the steps of cracking selected petroleum feed streams in the presence of steam, selecting specified fractions from the cracked distillate products, and polymerizing the said fraction with Friedel-Crafts catalysts.

In the usual process for the preparation of resins, petroleum fractions of the gas oil type are cracked in the presence of 50 to 90 mole percent steam at temperatures of 1000° F. up to 1500° F. to give highly unsaturated products. Gas oil fractions generally boil from 430 to 750° F.

It has now been discovered that greatly improved resin yields can be obtained if a fraction boiling below the gas oil range, preferably between 150 and 490° F., is used as feed to the steam cracking operation provided such streams are obtained from catalytic cracking operations. In other words, in accordance with the present invention, a heavy naphtha fraction obtained by a conventional catalytic cracking operation is subjected to steam-cracking and the unsaturated fractions obtained are then further fractionated to remove lower boiling materials. A cut having a boiling range of 250° F. to 490° F. is a superior feed material to the polymerization step.

It is desirable to remove the lighter fraction, boiling below 250° F. since only a low yield of a high aniline point resin product is obtained from this portion of the feed. The fractions, having an initial boiling point of 250° F., give a low aniline point resin. The aromatics present in the lower boiling fraction do not enter into the reaction, while the heavier fraction contains reactive aromatics that copolymerize with diolefins and olefins to form a resin.

This 250–490° F. fraction is subjected to polymerization with a Friedel-Crafts catalyst such as aluminum chloride, boron fluoride, stannic chloride, titanium tetrachloride, aluminum bromide, or other Friedel-Crafts catalysts and complexes of which are known as Friedel-Crafts catalysts. This polymerization may be effected at a temperature of about −150° F. to +200° F., preferably about 70° F. to 130° F. The amount of catalyst to be used will vary, somewhat inversely according to the temperature and somewhat according to the composition of the polymerization feed, but normally should be about 0.1 to 5.0, preferably 0.5 to 2.0% by weight based on the feed to the resinification.

For a further understanding of the invention reference may be had to the accompanying drawing in which the single figure is an elevational view generally diagrammatic, showing a flow plan embodying the improvement of the present invention.

Referring specifically to the drawing, a hydrocarbon petroleum fraction boiling in the gas oil boiling range (380–1000° F.) is introduced into fluidized solids reactor 1 by means of feed line 2. Reactor 1 is filled with catalyst maintained by conventional means in a pseudo-liquid state by the incoming feed vapors. The feed is introduced into the catalyst line 3 connecting regenerator 4 with reactor 1. Temperature and pressure conditions in reactor 1 are adjusted so as to secure the desired conversion of the feed oil. Spent catalyst is withdrawn from reactor 1 by means of line 5 and passed into a fluidized solids regenerator unit 4 wherein temperature and pressure conditions are adjusted to secure the desired revivification of the catalyst. Air or oxygen-containing gas is introduced into regenerator 4 by means of lines 6 and 7. Combustion gases are withdrawn overhead from regenerator 4 by means of line 8. These combustion gases as they flow upwardly in zone 4 contain finely entrained particles of catalyst which particles are removed by means of cyclone separator units 9 and 10 disposed in the upper area of zone 4. The fluidized solids cracked products are removed overhead from zone 1 by means of line 19 and introduced into a distillation zone 20.

Temperature and pressure conditions are adjusted in zone 20 to remove a heavy fraction by means of line 21; a gas oil fraction by means of line 22 and a heavy naphtha fraction by means of line 23. A fraction boiling in the motor fuel boiling range is removed by means of line 24. Gases are passed upwardly through an absorption section 25 and countercurrently contact a down-flowing absorption oil which is preferably separated from the light gas oil by means of line 26 and introduced into the top of the absorption section 25. Gas substantially completely free of normally liquid hydrocarbons are removed overhead from zone 25 by means of line 27 and handled as desired. The naphtha fraction withdrawn through line 23 is mixed with 50–90 mole percent of steam added through line 28 and introduced into cracking coil 13 housed in furnace 32.

Cracked products are withdrawn from furnace 32 through line 33 and introduced into distillation column 34 where temperature and pressure conditions are adjusted to remove a naphtha fraction as a side stream through line 35 and a gas oil fraction by line 36. Light gases are removed overhead through line 37. This naphtha fraction is the resin feed of the present invention. If desired the conditions in tower 31 may be so adjusted that the distillation is carried out under vacuum thus increasing the overhead yield and increasing the viscosity of the tar bottoms.

The fluidized solids technique for processing feed fractions, as for example, petroleum hydrocarbons and for carrying out other chemical reactions is a conventional one.

The conditions obtaining in the steam cracking zone 32 are also conventional and are in the range between 1000 and 1500° F.

The following example is presented to illustrate the invention in more complete detail, but it is not intended to limit the inventive concepts strictly thereto.

*Example I*

A heavy catalytic naphtha (38.9° API, 167–442° F. av. mol. wt. 135) was diluted with 78.5 mole percent steam and cracked at a coil outlet temperature of 1400° F. to a 29% conversion to $C_3$ and lighter products. When the cracked products were fractionated and the heavy naphtha fraction boiling at 250–490° F. was subjected to polymerization with $AlCl_3$ at 20° C., 12.5 wt. percent yields (based on feed to steam-cracking) of a 284° F. softening point resin with an iodine number of 55 were obtained as compared with 1.5 wt. percent of a 230° F. softening point resin with an iodine number of about 100 obtained by polymerizing the same fraction from the steam-cracking of a conventional straight-run gas oil at the same $C_3$ and lighter conversion level.

The nature of the present invention having been fully set forth and a specific example of the same given, what is claimed as new and useful and desired to be secured by Letters Patent is:

1. Process for preparing a feed suitable for preparing resins of high softening point which comprises subjecting a heavy naphtha fraction boiling between 150 and 490° F. and obtained from a catalytic cracking operation to cracking at 1000° to 1500° F. in the presence of 50 to 90 mole percent steam, and subjecting the resulting cracked products to distillation to separate a fraction boiling 250 to 490° F.

2. Process for the preparation of feed material, suitable for preparing resins of high softening point, which comprises contacting a hydrocarbon petroleum gas oil fraction boiling in the range between 380° and 1000° F. in a reaction zone with fluidized catalytic cracking particles under temperature and pressure conditions adapted to crack said hydrocarbons, fractionating said cracked products to obtain a plurality of fractions including a heavy naphtha fraction boiling at 150 to 490° F., subjecting the heavy naphtha fraction in the presence of 50 to 90 mole percent steam to temperature and pressure conditions adapted to crack the same and distilling the resulting cracked products to obtain a fraction boiling 250 to 490° F.

3. Process as defined in claim 2 wherein the pressure in the catalytic cracking zone is in the range from about 0–30 lbs. per square inch gage and wherein the temperature in said catalytic reaction zone is in the range from about 800 to 1000° F. and wherein the temperature in the steam cracking zone is in the range from about 1000 to 1500° F.

4. A process for making improved petroleum resins which comprises cracking a heavy naphtha fraction obtained from catalytic cracking and boiling from 150 to 490° F., at 1000 to 1500° F. in the presence of 50 to 90 mole percent steam, separating by distillation from the resulting unsaturated product stream a fraction having a boiling range of 250 to 490° F. and having essentially no material boiling below 250° F., contacting said selected fraction with Friedel-Crafts catalyst at a temperature between —150° F. and +200° F. and isolating the resin so formed.

5. A process for making improved petroleum resins which comprises cracking a heavy catalytically-cracked naphtha fraction boiling above 150° F. at 1000 to 1500° F. in the presence of 50 to 90 mole percent steam, fractionating the resulting unsaturated product stream to separate a fraction boiling completely in the range of 250 to 490° F., immediately thereafter polymerizing said selected fraction with a Friedel-Crafts catalyst at a temperature between —150° F. and +200° F. and separating the resin produced thereby.

6. A process for making improved petroleum resins which comprises cracking a heavy catalytically-cracked naphtha fraction boiling above 150° F. at 1000 to 1500° F. in the presence of 50 to 90 mole percent steam, fractionating the resulting unsaturated product stream to separate a fraction boiling from 250 to 490° F. and free of $C_7$ and lighter components boiling below 250° F., immediately thereafter subjecting said fraction to polymerization in the presence of $AlCl_3$ at 70 to 130° F., and separating the resin produced thereby.

References Cited in the file of this patent
UNITED STATES PATENTS
2,734,046  Nelson et al. _____ Feb. 7, 1956